United States Patent [19]

Gul et al.

[11] Patent Number: 4,724,149

[45] Date of Patent: Feb. 9, 1988

[54] METHOD FOR PRESERVATION OF FISH

[76] Inventors: Valentin E. Gul, Preobrazhensky val, 16, kv. 6.; Lidia I. Bulatnikova, ulitsa Mytnaya, 46/2, korpus 1, kv. 64.; Olga N. Belyatskaya, Schelkovskoe shosse, 87, korpus 1, kv. 194.; Ekaterina V. Popova, Ljubertsy-3, 34, kv. 84., all of, Moscow; Ljudmila G. Pavelieva, ulitsa Krasnoarmeiskaya, 23a, kv. 39., Astrakhan; Faina M. Rzhavskaya, ulitsa 11-ya Parkovaya, 44, korpus 4, kv. 39., Moscow; Vera K. Guseva, ulitsa Savushkina, 18, kv. 24., Astrakhan; Konstantin A. Leontiev, ulitsa Zvezdnaya, 17, kv. 5., Astrakhan; Vladimir D. Egorov, ulitsa Stepana Zdorovina, 3, kv. 12., Astrakhan; Vera V. Mozgunova, ulitsa Rabochaya, 23, kv. 5., Astrakhan, all of U.S.S.R.

[21] Appl. No.: 18,943

[22] PCT Filed: May 29, 1985

[86] PCT No.: PCT/SU85/00048

§ 371 Date: Dec. 22, 1986

§ 102(e) Date: Dec. 22, 1986

[87] PCT Pub. No.: WO86/06935

PCT Pub. Date: Dec. 4, 1986

[51] Int. Cl.$^4$ ............... A23B 4/10; A23B 4/14
[52] U.S. Cl. .................. 426/310; 426/332; 426/643
[58] Field of Search ............ 426/310, 643, 332

[56] References Cited

U.S. PATENT DOCUMENTS

| 3,806,612 | 4/1974 | Satz et al. | 426/310 X |
| 4,303,685 | 12/1981 | Katoh et al. | 426/643 X |
| 4,431,679 | 2/1984 | Crawford | 426/643 X |

FOREIGN PATENT DOCUMENTS

| 0136518 | 11/1978 | Japan | 426/643 |
| 0183045 | 10/1983 | Japan | 426/643 |

*Primary Examiner*—Arthur L. Corbin
*Attorney, Agent, or Firm*—Burgess, Ryan & Wayne

[57] ABSTRACT

A method for preservation of fish consists in that the original product is salt-cured and held, whereupon the fish is given a protective coating of a polymer composition containing polyvinyl alcohol, a mixture of polyhydroxyethyleneglycol ethers of monoethanolamides of synthetic fatty acids of the $C_{10}$–$C_{16}$ fraction, sorbic acid, glycerol and water, the mass percentage content of the components of said polymer composition being as follows:

| | |
|---|---|
| polyvinyl alcohol | 0.1 to 25.0 |
| mixture of polyhydroxyethyleneglycol ethers of monoethanolamides of synthetic fatty acids of the $C_{10}$–$C_{16}$ fraction | 0.00024 to 0.06 |
| sorbic acid | 0.01 to 4.0 |
| glycerol | 10 to 15 |
| water | to make up 100, | whereupon the thus-obtained coated fish is treated with an aqueous modifying solution of the following mass percentage composition:

| | |
|---|---|
| modifier | 1 to 25 |
| water | to make up 100. |

3 Claims, No Drawings

METHOD FOR PRESERVATION OF FISH

FIELD OF THE ART

The present invention relates to methods for preservation of food products.

PRIOR ART

One prior-art method for preservation of balyk (i.e., cured fillet of sturgeon or salmon) semiproduct consists in application of common salt to its surface, placing the semiproduct in salt-curing vats, filling-in with a saturated sodium chloride solution, keeping till a required salt content, removing from the salt solution, washing off undissolved salt and holding on rack stands for a uniform salt distribution in the flesh of the fish. Upon holding (attaining uniform salt content) the thus-salted balyk semiproduct is put in storage. To this end the salted balyk semiproduct is placed in containers, filled-in with an aqueous common salt solution having a density of 1.11 to 1.14 g/cm$^3$ and stored at minus 2° to minus 8° C. (cf. T. I. Makarova, A. I. Tinyakova, "Collected technological instructions on fish processing", Moscow, Pishchevaya promyshlennost' Publishers, 1980, v. 2, pp. 63 to 67 (in Russian).

For a better quality of a salted balyk semiproduct in the course of storage in a common salt solution, some antioxidants of the class of gallates, butylhydroxytoluene, and butylhydroxy-anisole are known to be added to that solution (cf. L. I. Yudina, "Application of antioxidants to prevent fat oxidation in pickled Atlantic herring", Moscow, Trudy VNIRO (Proceedings of the USSR Marine Fisheries and Oceanography Research Institute, 1962, v. 45, pp. 32 to 35).

However, the aforementioned methods suffer from a number of cardinal disadvantages:

washing of nitrogen-containing protein substances and lipids from a salted balyk semiproduct when stored in an aqueous common-salt solution, which results in a reduced nutritive value of the product;

swelling of muscular tissue which occurs with a salted balyk semiproduct when stored in the aforesaid solution, affects adversely the quality of the product and leads to a considerable loss of the product mass during subsequent storage;

transportation of the semiproduct in containers filled with the salt solution involves unjustified use of hauling facilities due to a considerable mass of the solution and the containers.

The invention has for its object to provide such a method for preservation of a balyk semiproduct that would make it possible to retain its nutritive value, and eliminate loss of its protein and lipid components.

DESCRIPTION OF THE INVENTION

The object is accomplished due to the fact that there is provided a method for preservation of a balyk semiproduct by salt-curing and holding the original product, and there-after, according to the invention, applying to the balyk semiproduct after holding a protective coating of a polymer composition containing polyvinyl alcohol, a mixture of polyhydroxyethyleneglycol ethers of monoethanolamides of synthetic fatty acids of the $C_{10}$–$C_{16}$ fraction sorbic acid, glycerol, water, the mass percentage content of the components of said polymer composition being as follows:

| | |
|---|---|
| polyvinyl alcohol | 0.1 to 25.0 |
| mixture of polyhydroxyethyleneglycol ethers of monoethanolamides of synthetic fatty acids of the $C_{10}$–$C_{16}$ fraction | 0.00024 to 0.06 |
| sorbic acid | 0.01 to 4.0 |
| glycerol | 10 to 15 |
| water | to make up 100, | whereupon the semiproduct together with the protective coating is treated with an aqueous modifying solution of the following mass percentage composition:

| | |
|---|---|
| modifier | 1 to 25 |
| water | to make up 100. |

It is desirable that use be made of boric acid and salts thereof as well as water-soluble metal chlorides as the modifier.

BEST MODE OF CARRYING THE INVENTION INTO EFFECT

The method of the invention is carried into effect as follows.

The essence of the method of preservation of a balyk semiproduct resides in that an original fishery product is subjected to salt-curing, holding, whereupon the original product is given a protective coating of a polymer composition either by dipping in or spraying with said composition. The polymer composition used features the following mass percentage content of its components:

| | |
|---|---|
| polyvinyl alcohol | 0.1 to 25 |
| mixture of polyhydroxyethyleneglycol ethers of monoethanolamides of synthetic fatty acids of the $C_{10}$–$C_{16}$ fraction | 0.00024 to 0.06 |
| sorbic acid | 0.01 to 4.0 |
| glycerol | 10 to 15 |
| water | to make up 100. |

Used as a modifying solution is the one having the following mass percentage composition:

| | |
|---|---|
| modifier | 1 to 25 |
| water | to make up 100. |

Boric acid and salts thereof, as well as water-soluble metal chlorides.

The presence of sorbic acid in the formulation of the composition as a structure-forming preservative provides for a preservative effect and at the same time promotes the formation of a coating on the surface of the product by virtue of additional structurization of the polymer.

The mixture of polyhydroxyethyleneglycol ethers of monoethanol-amides of synthetic fatty acids of the $C_{10}$–$C_{16}$ fraction, which is authorized for contact with foodstuffs, is used as a surfactant. The presence of the surfactant in the formulation of the composition provides for an optimum hydrophilic-hydrophobic balance in formation of a coating on fat-containing products. Formation of a coating which possesses a complex of properties that provide for retention of the quality of the product while under storage, does not occur unless the composition and the modifying solution contain all of the aforementioned components.

The thus-coated product is kept under storage at minus 2° to minus 8° C.

Application of a polyvinyl alcohol solution with a concentration below 0.1 percent fails to provide a continuous coating over the entire surface of the product, whereas such solutions with a concentration of 25.5 percent and over are liable to rapidly congeal under routine production conditions and to form clumps on the surface of the product.

The surfactant features a critical concentration of micelle-formation equal to 0.00024 mass percent. When the surfactant used has the value of a micelle-formation concentration below the critical, the solution fails to possess a required surface tension value for a flawless coating to form, whereas application of the surfactant with a micelle-formation concentration above 0.6 mass percent disturbs a required hydrophilic-hydrophobic balance.

Application of sorbic acid in concentrations below 0.01 mass percent fails to produce a required preserving and structurizing effect, while its concentrations higher than 4 mass percent cannot be used due to limited solubility of the acid in the system.

Adding the plasticizer to the modifying solution in an amount of 9 mass percent or less fails to provide a required plasticizing effect, whereas its mass percentage content equal to 16 or more deteriorates the quality of the coating obtained.

Application of the modifier in an amount of 0.9 mass percent or less fails to provide a structurizing effect of the system, whereas introducing the modifier in an amount of 25.5 mass percent and over is unreasonable from technological viewpoint, since surplus of the structuring agent deteriorates the quality of the coating (renders it brittle).

Some specimens of salt-cured balyk semiproduct prepared from sturgeon according to the method of the invention and provided with a protective coating, as well as a salt-cured balyk semiproduct made of sturgeon and kept stored in a common salt solution, were subjected to organoleptic assessment after they had been kept under storage within a six-month period at minus 2° to minus 8° C. It is found out that the specimen of salt-cured balyk semiproduct kept stored in a coating from the polymer composition according to the invention, is superior, as to its organoleptic characteristics, to that stored in a common-salt solution. The balyk semiproduct that has been stored in a common-salt solution exhibits on its surface a deposit of oxidized fat having a specific odour, its tissues being flabby and showing stratification. Some congealed lipids are observed on the surface of the common-salt solution that have separated out of the product. After a six-month storage the product is degraded into the second grade on account of fat oxidation. The specimens of the semiproduct that have been stored for six months according to the method of the invention, feature succulent consistency. The quality of balyk semiproduct kept under storage according to the method of the invention is bettered, as compared with that stored according to the known method, due to its being free from stratification of muscular tissue.

As it has been demonstrated by special studies, the processes of accumulation of primary and secondary oxidation products in the lipids of the balyk semiproduct (i.e., peroxide, aldehyde and acid values), proceed at a much slower rate in the semiproduct stored according to the method of the invention as compared with the known method. Water-retaining property of the muscular tissue is better maintained in the semiproduct when stored according to the method of the invention than in that stored according to the known method. When the semiproduct is stored in a common-salt solution, its muscular tissue is observed to have swollen badly (by 32 percent), the protein and lipid components thereof being washed out to a great extent, which affects adversely the nutritive value of balyk as the finished product. Storage of balyk semiproduct according to the method of the invention retains its nutritive value and mass due to the components of its tissues being not washed out therefrom.

For a better understanding of the present invention the following illustrative examples of its practical embodiment are given hereinbelow.

EXAMPLE 1

20 kg of sturgeon sides chilled to minus 2° C. is rubbed with NaCl, placed in a salt-curing vat and poured with a filtered-out common-salt solution having a density of 1.2 g/cm$^3$ and chilled to minus 2° C. After salt-curing the fishery product is discharged from the vats, washed with a common-salt solution with a density of 1.07 g/cm$^3$ and placed on rack stands at a maximum temperature of plus 10° C. to attain a uniform salt content. After a two-day holding the thus-obtained salt-cured balyk semiproduct is coated with a polymer composition of the following mass percentage content of its components:

| | |
|---|---|
| polyvinyl alcohol | 0.1 |
| mixture of polyhydroxyethyleneglycol ethers of monoethanolamides of synthetic glyceric acids of the $C_{10}$–$C_{16}$ fraction | 0.00024 |
| sorbic acid | 0.01 |
| glycerol | 10 |
| water | to make up 100. |

Thereupon the product covered with the aforesaid coating is immersed in a modifying bath, containing a solution of the following mass percentage content:

| | |
|---|---|
| boric acid | 1 |
| water | to make up 100. |

Then the semiproduct is taken out of the bath and stored at minus 2° to minus 8° C.

EXAMPLE 2

A salt-cured balyk semiproduct obtained as in Example 1, is coated with a polymer composition of the following mass percentage content:

| | |
|---|---|
| polyvinyl alcohol | 25 |
| mixture of polyhydroxyethylene-glycol ethers of monoethanolamides of synthetic glyceric acids of the $C_{10}$–$C_{16}$ fraction | 0.06 |
| sorbic acid | 4.0 |
| glycerol | 15 |
| water | to make up 100. |

Then the semiproduct is treated with a modifying composition of the following mass percentage content:

| | |
|---|---|
| NaCl | 25 |
| Water | to make up 100. |

Thereupon the thus-coated semiproduct is stored as in Example 1.

EXAMPLE 3

A salt-cured balyk semiproduct obtained as in Example 1, is coated with a polymer composition of the following mass percentage content:

| | |
|---|---|
| polyvinyl alcohol | 10 |
| mixture of polyhydroxyethyleneglycol glyceric acids of the $C_{10}$–$C_{16}$ fraction | 0.03 |
| sorbic acid | 0.15 |
| glycerol | 12 |
| water | to make up 100. |

Then the semiproduct is treated with a modifying composition of the following mass percentage content:

| | |
|---|---|
| $CaCl_2$ | 20 |
| water | to make up 100. |

Thereupon the thus-coated semiproduct is kept under storage as in Example 1.

EXAMPLE 4

A salt-cured balyk semiproduct obtained as in Example 1 is coated with a polymer composition of the following mass percentage content:

| | |
|---|---|
| polyvinyl alcohol | 10 |
| mixture of polyhydroxyethyleneglycol ethers of monoethanolamides of synthetic glyceric acids of the $C_{10}$–$C_{16}$ fraction | 0.03 |
| sorbic acid | 0.15 |
| glycerol | 10 |
| water | to make up 100. |

Then the semiproduct is treated with a modifying composition of the following mass percentage content:

| | |
|---|---|
| sodium borate | 3 |
| water | to make up 100. |

Thereupon the thus-coated semiproduct is stored as in Example 1.

EXAMPLE 5

A salt-cured balyk semiproduct obtained as in Example 1 is coated with a polymer composition of the following mass percentage content:

| | |
|---|---|
| polyvinyl alcohol | 10 |
| mixture of polyhydroxyethyleneglycol ethers of monoethanolamides of synthetic glyceric acids of the $C_{10}$–$C_{16}$ fraction | 0.03 |
| sorbic acid | 0.15 |
| glycerol | 12 |
| water | to make up 100. |

Then the semiproduct is treated with a modifying composition of the following mass percentage content:

| | |
|---|---|
| Boric acid | 2 |
| Water | to make up 100 |

Thereupon the thus-coated semiproduct is stored as in Example 1.

INDUSTRIAL APPLICABILITY

The method of preservation of a balyk semiproduct may find application in the production and storage of fish and fishery products.

What is claimed is:

1. A method for preservation of fish, which comprises coating the fish with a protective coating of a polymer composition containing polyvinyl alcohol, a mixture of polyhydroxyethyleneglycol ethers of monoethanolamides of synthetic fatty acids of the $C_{10}$–$C_{16}$ fraction, sorbic acid, glycerol and water, the weight percentage content of the components of said polymer composition being as follows:

| | |
|---|---|
| polyvinyl alcohol | 0.1 to 25.0 |
| mixture of polyhydroxyethyleneglycol ethers of monoethanolamides of synthetic fatty acids of the $C_{10}$–$C_{16}$ fraction | 0.00024 to 0.06 |
| sorbic acid | 0.01 to 4.0 |
| glycerol | 10 to 15 |
| water | to make up 100, | whereupon the coated fish is treated with an aqueous modifying solution of the following weight percentage composition:

| | |
|---|---|
| modifier | 1 to 25 |
| water | to make up 100. |

2. A method as claimed in claim 1, wherein the modifier comprises a member selected from the group consisting of boric acid, salts of boric acid and water-soluble metal chlorides.

3. The method of claim 2, wherein the modifier is selected from the group consisting of sodium chloride, calcium chloride, sodium borate and boric acid.

* * * * *